TRANSMISSION SYSTEM FOR TRANSMITTING PULSES

Filed March 4, 1965 2 Sheets-Sheet 1

INVENTORS
FRANK DE JAGER
LEO E. ZEGERS
JAN KUILMAN
BY Frank R. Jifari
AGENT

TRANSMISSION SYSTEM FOR TRANSMITTING PULSES

Filed March 4, 1965 2 Sheets-Sheet 2

INVENTORS
FRANK DE JAGER
LEO E. ZEGERS
JAN KUILMAN

BY Frank R. Trifari
AGENT

United States Patent Office 3,409,875
Patented Nov. 5, 1968

3,409,875
TRANSMISSION SYSTEM FOR TRANSMITTING PULSES

Frank De Jager, Leo Eduard Zegers, and Jan Kuilman, Emmasingel, Eindhoven, Netherlands, assignors to North American Philips Company, Inc., New York, N.Y., a corporation of Delaware Filed Mar. 4, 1965, Ser. No. 437,181
Claims priority, application Netherlands, Mar. 5, 1964, 6402192
7 Claims. (Cl. 340—146.1)

ABSTRACT OF THE DISCLOSURE

In a pulse transmission system, pulses are applied to two transmitting channels, one of which includes a delay. The received signals are applied to two corresponding receiving channels, one of which includes a delay, so that the outputs of the receiving channels are the same. The outputs of the receiving channels are applied to an output device by way of a change over switch. The switch is controlled by an error responsive device responsive to unequal signals at the outputs of the receiving channels, so that upon detection of unequal signals the output device is held connected to receiving channel having a delay device for a predetermined time, then is connected to the other receiving channel for a predetermined time, and then is returned to its connection with the original channel. The system corrects for bursts of interference in the transmission path.

The invention relates to a transmission system for transmitting pulses which comprises a transmitting apparatus, a transmission path subjected to disturbances causing error bursts in the transmitted pulses and a receiving apparatus, the transmitting apparatus including a pulse source of multivalent pulses, while the receiving apparatus is provided with a detection device for the detection of the transmitted pulses in an environment of noise and disturbances, an error being made when the detected pulse has a value different from that of the transmitted pulse while the detected pulses are applied to a pulse-operated device.

It has been found in practice that in the transmission of pulses through telephone circuits, the errors occurring in the received pulses trains are not distributed at random, but mostly appear in groups. Such an error group, sometimes referred to as an "error burst," may appear as a result of pulse noise in the telephone circuit which may be due, for example, to dialling or signalling pulses in adjacent telephone circuits.

It is an object of the invention to provide a transmission system of the aforesaid kind for correcting the errors which occur in the received pulse trains, particularly error bursts.

A transmission system according to the invention is characterized in that two transmission channels are provided, in that the transmitting apparatus includes a pulse-delay device with a previously determined delay time for delaying the pulses of the pulse source, in that the pulses of the pulse source are transmitted through a first transmission channel and the pulses delayed by the pulse-delay device are transmitted through a second transmission channel, in that the receiving apparatus comprises a pulse-delay device with the same delay time as that of the delay device at the transmitter end for delaying the pulses received through the first transmission channel, and in that the pulses delayed by the pulse-delay device and the pulses received through the second transmission channel are applied to a first input and to a second input, respectively, of a changeover device which has a rest position and a work position and which, in accordance with its position, applies the pulses appearing at the first input or at the second input to the pulse-operated apparatus, whilst the receiving apparatus comprises an error-detection device for the detection of errors in the detected pulses, which error-detection device controls the change-over device and sets it to one position or to the other.

The invention and its advantages will now be described more fully with reference to the accompanying drawings in which.

For the purpose of simplifying the following description, a transmission system is considered having a signalling speed of 1000 Bauds that is to say, 1000 pulses per second, each pulse having a duration of 1 msec. The pulses are bivalent, the two values being designated by 0 and 1, and further a pulse having a value 0 is referred to as a 0-pulse and a pulse having value 1 as a 1-pulse Prior to modulation and after demodulation a 0-pulse is distinguished from a 1 pulse by a difference in amplitude or in polarity of the direct voltage. In telegraphy, for example, a 0 pulse corresponds to a spacing element and a 1 pulse to a marking element.

Figure 1:
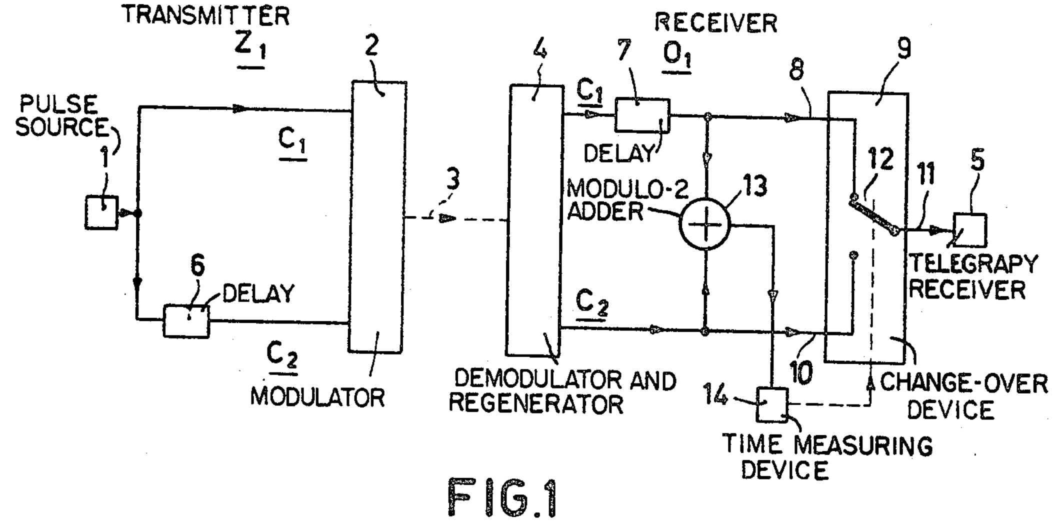
FIG. 1 is a block diagram of a transmission system according to the invention.

The transmission system for transmitting pulses which is shown in FIG. 1 comprises a transmitting apparatus $Z_1$ and a receiving apparatus $O_1$. The transmitting apparatus includes a pulse source 1, for example a telegraph transmitter, which transmits a train of bivalent information pulses. The transmitting apparatus further includes a modulation device 2 which modulates a carrier wave by the pulse trains applied to it and which transmits the modulated carrier wave via a transmission path 3 to the receiving apparatus $O_1$. The transmission path 3 consists, for example, of a telephone circuit which is subject to pulse disturbances. The receiving apparatus $O_1$ includes a demodulation- and pulse-regenerating device 4 which demodulates the received modulated carrier wave and detects the pulses in the demodulated carrier wave and subsequently regenerates them. In the pulse regeneration, a distorted pulse is converted into a pulse having a constant duration of 1 msec. and a constant amplitude. The receiving apparatus further includes a pulse-operated device 5, for example a telegraphy receiver, which further processes the pulse train applied to it.

As a result of the noise and disturbances occurring in the transmission path 3, errors are made in the detection of the pulses in the demodulated carrier wave. The pulse train regenerated by the demodulation device 4 then includes error pulses which have a value different from that with which they are transmitted by the pulse source 1. It has been found in practice that the errors are not distribued at random in time, but they appear in groups. These groups are referred to as erorr bursts. It has been found in practice that two such subsequent error bursts are each time separated by a rest period during which no or substantially no errors are made. An error burst does not have a given fixed duration, but this duration may vary, for example, between 0.01 second and 1 second. A transmission system for correcting errors is not capable of carrying out a 100% error correction under all conditions. The design of such an error-correcting transmission system is invariably based on the statistical data of the errors which may occur in a given transmission path. It is assumed hereinafter that it must just be possible to correct completely an error burst having a maximum duration of 100 milliseconds which is followed by a rest period of at least 100 milliseconds.

The transmission system so far described comprises two transmission channels. These channels are designated in the figures by the common references $C_1$ and $C_2$, the same references being used at the transmitter end and at the receiver end of each channel. These two transmission channels may, for example, utilize the same telephone circuit by means of frequency multiplex or time multiplex. The two channels may also be conducted via different telephone circuits. Furthermore, it is also possible for the two channels to use one telephone circuit by quadrature-phase modulation of the same carrier wave. The manner in which the two transmission channels are obtained is not of importance for the invention and is therefore not represented in the drawing.

The transmitting apparatus includes a pulse delay device 6 with a delay time of 100 milliseconds for delaying the pulses of the pulse source 1. The pulse delay device may be constituted, for example, by a shift register or by a magnetic core memory used as a shift register. In the last-mentioned use, the magnetic core memory is programmed so that all the magnetic cores are each time read in cyclic sequence and that a pulse is written in the vacated memory core, as a result of which in the case of a memory capacity of, for example, 10,000 binary digits a pulse is read 10,000 cycle periods after it has been written. With a cycle period of 1 msec., a delay time of 10 seconds may be obtained. A simple core memory having a capacity of 100 binary digits is sufficient to obtain a delay time of 100 milliseconds. The pulse train produced by the pulse source 1 is transmitted directly via the channel $C_1$, while the pulse train delayed by the pulse delay device 6 is transmitted via the channel $C_2$. The receiving apparatus includes a pulse delay device 7 for delaying the pulse train received via the channel $C_1$, which provides same time delay of 100 milliseconds as the pulse delay device 6 in the transmitting apparatus. The pulse train delayed by the pulse delay device 7 is applied to an input 8 of a change-over device 9 and the pulse train received via the channel $C_2$ is directly applied to a second input 10 of the change-over device. The output 11 of the change-over device is connected with the input of the pulse-operated device 5. The change-over device comprises a switch arm 12 which in the position shown, hereinafter referred to as rest position, connects the input 8 with the output 11 and in the other position, hereinafter referred to as working position, connects the input 10 with the output 11. The delay times introduced by the pulse delay devices 6 and 7 into the two transmission channels are equal for the two channels so that a pulse sent by the pulse source 1 through the channels $C_1$ and $C_2$ appears at the same time at the inputs 8 and 10 of the change-over device. The values of the pulses appearing at the same time at inputs 8 and 10 are compared by means of a modulo-2 adder 13 the two inputs of which, indicated by an arrow in the direction of the switching symbol, are connected to the inputs 8 and 10. A modulo-2 adder, which is a circuit arrangement similar to a binary half-adder having only a sum output, delivers a 0 pulse at the output when the two input pulses have equal values and a 1 pulse when the two input pulses have different values. With disturbances of the kind considered in the present application, each disturbance is invariably preceded by a rest period of 100 milliseconds. During such a disturbance-free rest period of 100 milliseconds, the receiving apparatus receives a disturbance-free train of 100 pulses through each of the channels $C_1$ and $C_2$. At the starting instant of the pulse disturbance succeeding the rest period the pulse train received through the channel $C_1$ is entirely present in the pulse delay device 7, which in the case of a delay time of 100 milliseconds always contains 100 pulses. As soon as an error is made in the detection of a pulse received through the channel $C_2$, pulses of different values appear at the inputs 8 and 10 of the change-over device 9, since the undisturbed output pulse of the delay device 7 has the original value. With different values of the two output pulses, the modulo-2 adder 13 delivers a 1-pulse which indicates the error made. The instant at which this 1-pulse appears indicates the instant at which the influence of the disturbance is detected and consequently indicates the starting instant of the disturbance. As has been assumed, a disturbance has a maximum duration of 100 milliseconds so that after the starting instant of a disturbance of train of 100 pulses is received through the channels $C_1$ and $C_2$ which may include errors. At most, all the 100 pulses may be in error when they are all received with the reverse values and the receiving device responds as if this were actually the case. The output pulses of the adder 13 are applied to a time measuring device 14 which controls the change-over device 9. The time measuring device 14 includes a source of pulses which coincide with the received pulses and, after the first 1 pulse has been received, the time measuring device 14 counts 99 clock pulses, whereupon it changes the switching arm 12 to the working position for the subsequent 100 clock pulses. During this total number of 199 pulses, the time measuring device renders itself insensitive to further input pulses and consequently responds only to each first 1-pulse. After these 199 pulses, the switch arm 12 is restored to the rest position and the time measuring device 14 again renders itself insensitive to the next pulse of the added 13. After an error has been detected and the pulse received at this instant through the channel $C_1$ has been applied to the delay device 7, the delay device 7 still contains 99 pulses received during the preceding rest period. These 99 pulses are applied through the switch arm 12 to the pulse-operated device 5 in the time during which the time measuring device 14 is counting these pulses. After the time measuring device 14 has counted these pulses the switch arm 12 is changed over to the working position. At the instant at which the switch arm 12 is changed over to the working position, the disturbance has ceased and the pulse delay device 7 comprises the train of 100 pulses which was received during the disturbance. The switch arm 12 is held in the working position for 100 milliseconds and during this period the disturbed pulse train leaves the pulse delay device 7. At the same time, the receiving apparatus receives the same pulse train once more through the channel $C_2$, but now without disturbances. This undisturbed pulse train is applied to the pulse-operated device 5 in the working position of the switch arm 12. After the undisturbed pulse train has been completely transmitted to the pulse-operated device, the switch arm 12 changes back to its rest position and remains in this position until again an error is detected and the described cycle is repeated. A complete error correction is thus possible for pulse disturbances which have a duration of 100 milliseconds and are spaced by disturbance-free rest periods of 100 milliseconds. Also in the case of pulse disturbances having a duration shorter than 100 milliseconds, a complete error correction is possible, provided that the sum of the duration of the pulse disturbance and of the duration of the rest period following this pulse disturbance is at least equal to 200 milliseconds. Individual errors are likewise corrected, provided that the lapse of time between two successive individual errors is at least equal to 200 milliseconds.

Figure 2:
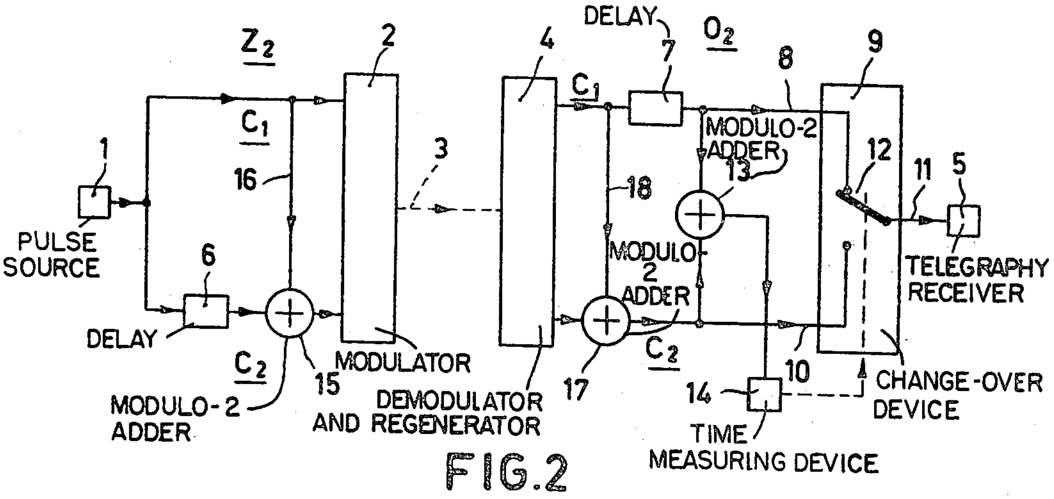
FIG. 2 is a block diagram of a development of the transmission system illustrated in FIG. 3.

It is possible that a pulse disturbance in the transmission path 3 has different effects in the two channels $C_1$ and $C_2$ and that the detected starting instant of the pulse disturbance in the channel $C_2$ does not coincide with the starting instant of the pulse disturbance in the channel $C_1$. In such cases, the error pulses received through the channel $C_1$ before the instant of detection are not detected and these errors remain in the pulse train applied to the pulse-operated device. When the two channels are conducted via separate telephone circuits, the channel $C_1$ may be disturbed without a simultaneous disturbance appearing in the channel $C_2$, but in this case the disturbance in the channel $C_1$ is not detected at all. These disadvantages are obviated by the transmission system shown in FIG. 2. This transmission system comprises a transmitting apparatus $Z_2$ and a receiving apparatus $O_2$. The parts of these apparatuses which correspond to the parts shown in FIG. 1 are designated by the same references. The difference from the transmission system shown in FIG. 1 is that the two transmission channels $C_1$ and $C_2$ are coupled with each other so that a disturbance in the channel $C_1$ may be detected at the receiver end of the channel $C_2$. The transmitting apparatus $Z_2$ includes a modulo-2 adder 15 connected in the transmission channel $C_2$ between the output of the pulse delay device 6 and an input of the modulation device 2. The pulse train delayed by the pulse delay device 6 is applied to a first input of the adder and the pulse train of the pulse source 1 is applied through a connecting lead 16 to a second input of the adder. The sum train produced by the adder is sent through the channel $C_2$ to the receiving apparatus $O_2$. This receiving device includes a modulo-2 adder 17 connected in the transmission channel $C_2$ between an output of the demodulation device 4 and the input 10 of the change-over device 9. The pulse train received through the channel $C_2$ is applied to a first input of the adder and the pulse train received through the channel $C_1$ is applied through a connecting lead 18 to a second input of the adder. The pulse train produced by the adder 17 is finally applied to the input 10 of the change-over device 9. In the absence of disturbances, the latter pulse train is equal to the pulse train transmitted by the pulse delay device 6, which may be proved as follows. In the transmission of the latter pulse train through the channel $C_2$, the pulse train of the pulse source 1 is first added thereto at the transmitter end, whereupon the pulse train received through the channel $C_1$ is added to this sum train at the receiver end. The latter pulse train is equal to the pulse train transmitted by the pulse source 1. The modulo-2 sum of two identical pulse trains is a train of 0-pulses and the modulo-2 sum of a train of 0-pulses and a pulse train is the pulse train itself, which results in that the pulse train at the input of the adder 17 is equal to the pulse train transmitted by the delay device 6. Consequently, in the absence of disturbances, there is no essential difference between the pulse trains which are applied in FIGS. 1 and 2 through the channel $C_2$ to the changeover device 9. However, when an error pulse is received through the channel $C_2$, an error pulse appears also at the output of the adder 17 and this error is detected by means of the modulo-2 adder 13 in the manner described hereinbefore. After the detection of an error, the transmission system shown in FIG. 2 operates exactly in the same manner as the transmission system shown in FIG. 1. In the transmission system shown in FIG. 2, errors resulting from a disturbance which only influences the channel $C_1$ are corrected in exactly the same manner as the errors made in the transmission system shown in FIG. 1 in the case of a simultaneous disturbance in both channels. In the transmission system shown in FIG. 2, a simultaneous disturbance in both channels produces two trains of error pulses, that is to say, a train originating from the channel $C_1$ and a train originating from the channel $C_2$. These two trains of error pulses are added to each other by the modulo-2 adder 17, as a result of which a new train of error pulses is produced at the output of the adder. The adder 13 detects the first error pulse in this new train and from this instant the time measuring device 14 is switched into circuit. When the first error pulse in one train applied to the adder 17 exactly coincides with the first error pulse in the other train applied to the adder 17, the two errors compensate for each other so that no error pulse appears at the output of the adder. This compensation may generally apply to the first N error pulses of the two trains, where N is an arbitrary integer, with a probability which strongly decreases with increasing values of N. In these circumstances, the instant at which an error is detected does not coincide with the instant at which the first error pulse is received. Consequently, it is not absolutely certain that the first error pulse appearing at the output of the adder 17 actually coincides with the beginning of a pulse disturbance. Let it be assumed that at the instant at which an error is detected at least one of the K preceding pulses is an error pulse also, where K is an integer which may be chosen. If this assumption is correct and K is chosen to be 5, at the instant of detection of an error, the pulse-delay device 7 contains 94, not 99, undisturbed pulses. Consequently, the starting instant of a disturbance is fixed at an instant 5 milliseconds prior to the instant at which the first error is detected. The time measuring device 14 may be adjusted so that it changes the switch arm 12 to the working position after counting 94 instead of 99 pulses and holds this arm in this position during the subsequent 100 pulses, whereupon it is returned to the rest position. During the counting of these 94 pulses, the 94 undisturbed pulses are transferred from the delay device 7 to the pulse-operated device 5, whereupon the delay device is filled completely with a group of 100 disturbed pulses. As has been described hereinbefore, the same group of 100 pulses is now received, without any disturbance, through the channel $C_2$ and this group is applied through the change-over device 9 to the pulse-operated device.

The maximum corrigible duration of a pulse disturbance is reduced by the said step from 100 milliseconds to 95 milliseconds. This reduction increases with increasing values of K, as a result of which the available delay time of the pulse delay devices 6 and 7 is utilized in a gradually less effective manner for the error correction. In the transmission system shown in FIG. 3, low values of K may be sufficient and the available delay time of the delay devices may be utilized to best advantage for the error correction. The transmitting apparatus $Z_3$ shown in FIG. 3 includes a coding device 19 connected between the modulo-2 adder 15 and the modulation device 2 while the receiving apparatus $O_3$ includes a decoding device 20 connected between the demodulation device 4 and the adder 17. The decoding device 20 operates in a manner opposite to that of the decoding device 19. The pulse train transmitted through the channel $C_2$ is first coded by the coding device 19 and is then decoded by the decoding device 20 to restore the original pulse train. Consequently, in the absence of disturbances, there is no essential difference between the pulse trains which are applied in FIGS. 2 and 3 through the channel $C_2$ to the adder 17. A train of error pulses which are received through the channel $C_2$ in the case of a disturbance in this channel is converted by the decoding device 20 into a new train of error pulses. When disturbances appear simultaneously in the channels $C_1$ and $C_2$, a train of error pulses is also received through the channel $C_1$. The latter train is added by the modulo-2 adder 17 to the train of error pulses converted by the decoding device 20. In this case, the likelihood of a compensation of errors which extends over the first N errors is very slight even at low values of N as a result of the entirely different shapes of the two trains of error pulses applied to the adder 17. Consequently, it is not likely either that the starting instant of a pulse disturbance is advanced considerably with respect to the instant at which an error is detected so that low values of K may then be sufficient, more particularly, K may be chosen=0.

Figures 3, 4:
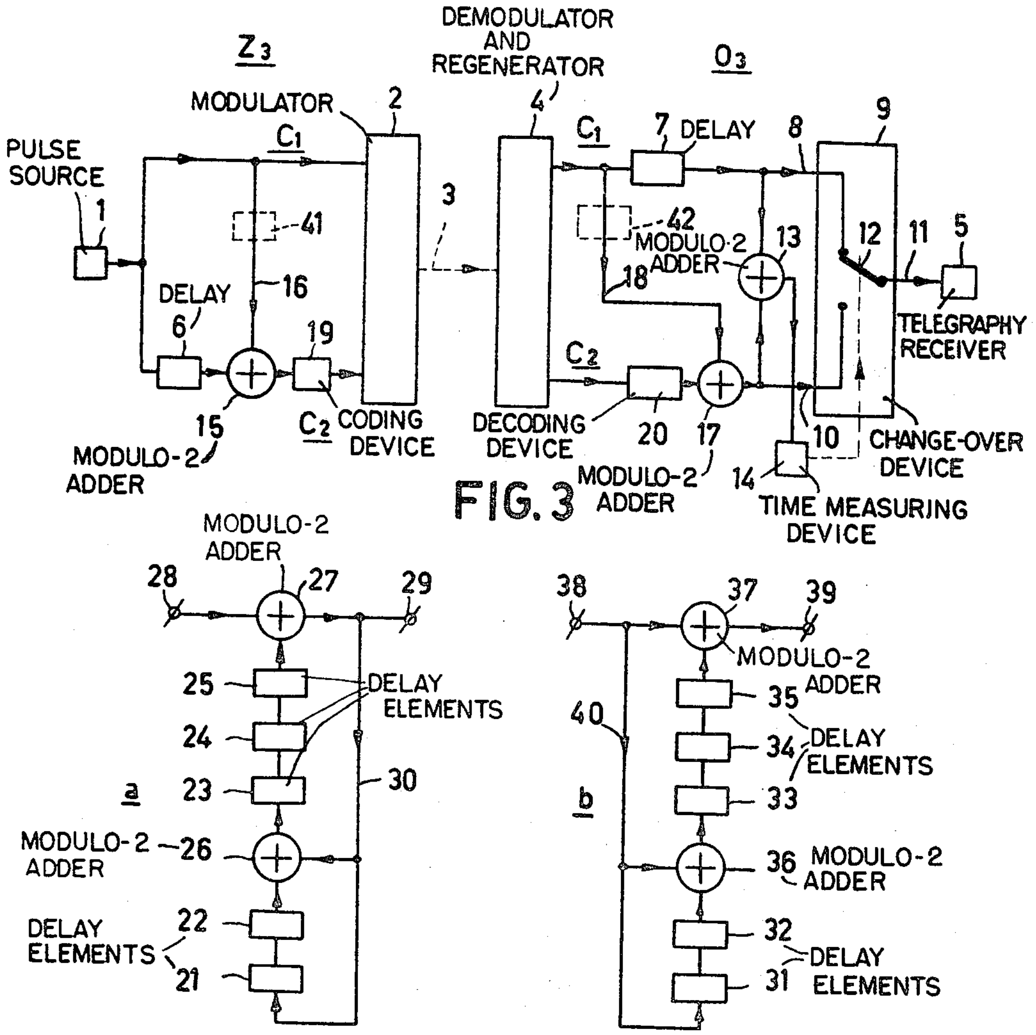
FIG. 3 is a block diagram of a preferred embodiment of a transmission system according to the invention.
FIG. 4 shows a block diagram of a coding and a decoding device suitable for use in the transmission system illustrated in FIG. 3.

The devices 19 and 20 may be of a type known per se, such as that described in an article of D. A. Huffman, "The Synthesis of Linear Sequential Coding Networks," published in "The Proceedings of the Symposium on Information Theory," Ac. Press 1956, pages 77 to 95. A coding device suitable for use in the transmission system of FIG. 3 is shown in FIG. 4*a* while a decoding device suitable for this purpose is shown in FIG. 4*b*. The coding device shown in FIG. 4*a* comprises a chain of pulse delaying elements 21–25 which each have a delay time of 1 msec. and modulo-2 adders 26 and 27. The input of the coding device is indicated at 28 and the output at 29. A pulse at the input 28 is added by the modulo-2 adder 27 to the output pulse of the pulse delaying element 25 and the sum pulse is applied to the output 29. This output pulse is also applied through a conductor 30 to the delaying element 21 and to the adder 26. The pulse applied to the delaying element 21 reaches the adder 27 through the delaying elements 21 and 22, the adder 26 and the delaying elements 23–25 after 5 milliseconds. During the transmission from the delaying element 22 to the delaying element 23, the adder 26 adds to this pulse the output pulse appearing at this instant. The latter pulse reaches the adder 27 through the delaying elements 23–25 after 3 milliseconds. The pulse which is added by the adder 27 to the pulse applied to the input 28 is consequently the modulo-2 sum of the third and of the fifth preceding output pulses. The decoding device shown in FIG. 4*b* operates in the inverse sense. This device comprises a chain of pulse delaying elements 31–35 and modulo-2 adders 36 and 37. The input of the decoding device is indicated at 38 and the output at 39. A pulse applied to the input 38 is added by the adder 37 to the output pulse of the pulse delaying element 35 and the sum pulse is applied to the output 39. The input pulse is also applied through a conductor 40 to the adder 36 and to the pulse delaying element 31. The pulse applied to this delaying element reaches the adder 37 after 5 milliseconds through the delaying elements 31–35 and during the transmission from the delay element 32 to the delay element 33 the adder 36 adds to this pulse the input pulse appearing at this instant. The latter pulse reaches the adder 37 after 3 milliseconds through the delay elements 33–35. The pulse which is added by the modulo-2 adder 37 to the input pulse is consequently the modulo-2 sum of the third and of the fifth preceding input pulses. During the transmission of a pulse from the input 28 of the coding device to the output 39 of the decoding device, the third and the fifth preceding output pulses of the coding device are first added thereto in the coding device, whereupon once more the fifth and the third preceding output pulses are added thereto in the decoding device. As a result of these successive additions, the originally transmitted pulse appears at the output 39. When a pulse at the input 38 of the decoding device is incorrect as a result of a disturbance in the transmission channel $C_2$, an error pulse also appears at the output 39. The error pulse at the input 38 is also applied through the conductor 40 to the pulse delay element 31 and to the adder 36. The error is consequently repeated at the third and the fifth following input pulses if the latter themselves are correct. When one of these output pulses itself is also an error pulse, the errors compensate for each other at this pulse. Hence, the pattern of the errors at the output of the decoding device is totally different from the pattern of the errors at the input of this device. In the case of a slight difference between the two original error patterns, the possibility that the converted error pattern of the channel $C_2$ is equal to the error pattern of the channel $C_1$ is very slight and consequently it is not very likely either that a compensation of errors is effected in the adder 17. An alternative solution to achieve a difference between the error patterns appearing at the two inputs of the modulo-2 adder 17 is shown in FIG. 3 in dotted lines. In this case, instead of the coding device 19, a coding device 41 is provided in the supply lead 16 to the modulo-2 adder 15, while instead of the decoding device 20 an identical coding device 42 is provided in the supply lead 18 to the modulo-2 adder 17. These coding devices 41 and 42 may be of the type shown in FIG. 4*b*. In the absence of disturbances, the output pulse train of the adder 71 is again equal to that of the output pulse train of the delay device 6, since the same pulse train is twice added to this train modulo-2. The coding device 22 brings about the conversion of the error pattern of the channel $C_1$, as a result of which a compensation of errors is again prevented.

What is claimed is:

1. A pulse transmission system comprising a transmitter, a receiver, and a transmission path between said transmitter and receiver; said transmitter comprising a source of pulse signals, first and second transmitting channels connected to said source, and means applying the outputs of said first and second transmitting channels to said transmission path, said second transmitting channel having first delay means for delaying pulses a predetermined time with respect to pulse transmission in said first transmitting channel; said receiver comprising first and second receiving channels, means connected to said path for applying signals corresponding to said first and second transmitting channels to said first and second receiving channels respectively, pulse output means, change over switch means for selectively connecting said output means to the outputs of said first and second receiving channels, and means for controlling said switch means, said first receiving channel comprising second delay means having a delay time equal to the delay time of said first delay means, said control means comprising means for comparing the outputs of said first and second receiving channels, means for holding said switch means to one of its positions for a predetermined time upon the detection of unequal signals at the outputs of said first and second receiving channels, for changing said switch means to its other position for a predetermined time thereafter, and then for returning said switch means to its said one position.

2. The system of claim 1 in which said switch means in said one position applies the output of said first channel to said output means.

3. A pulse transmission system comprising a transmitter, a receiver, and a transmission path between said transmitter and receiver; said transmitter comprising a source of multivalent pulses, first and second transmitting channels, means applying said multivalent pulses to said first and second channels, said second channel having delay means for delaying pulses a predetermined time with respect to pulses passing through said first channel, and means applying the outputs of said first and second channels to said transmission path; said receiver comprising first and second receiving channels, means connected to said path for applying pulses corresponding to the outputs of said first and second transmitting channels to said first and second receiving channels respectively, pulse operated output means, change-over means for selectively applying the outputs of said first and second receiving channels to said output means, error-detecting means connected to said first and second receiving channels to produce an error signal upon the occurrence of different pulse levels at predetermined points on said first and second receiving channels, and means responsive to said error signal for controlling said change-over means, said first receiving channel includes delay means having a delay time equal to the delay time of the delay means in said transmitter and connected between the input thereof and the point at which said error detecting means is connected to said first receiving channel, said means responsive to said error signal comprising time-measuring means whereby said change over means is held in one of its positions for a predetermined time upon the occurrence of an error signal, and then changes to the other position for a predetermined time irrespective of the occurrence of an error signal, and then returns to its first mentioned position.

4. A pulse transmission system comprising a transmitter, a receiver, and a transmission path between said transmitter and receiver; said transmitter comprising a source of pulse signals, first and second transmitting channels connected to said source, and means applying the outputs of said first and second transmitting channels to said transmission path, said second transmitting channel to said transmission path, said second transmitting channel having first delay means for delaying pulses a predetermined time with respect to pulse transmission in said first transmitting channel; said receiver comprising first and second receiving channels, means connected to said path for applying signals corresponding to said first and second transmitting channels to said first and second receiving channels respectively, pulse output means, change over switch means for selectively connecting said output means to the outputs of said first and second receiving channels, means for comparing the outputs of said first and second receiving channels to produce an error signal upon the occurrence of unequal signals, and time measuring means responsive to said error signal for holding said switch means for a predetermined time to the one of its positions wherein the output of said first receiving channel is connected to said output means for thereafter changing said switch means to the other of its positions for a predetermined time, and then returning said switch means to its said one position, said first receiving channel including second delay means for delaying pulses for a time equal to the delay of said first delay means.

5. The system of claim 4 wherein said comparing means comprises a modulo-2 adder.

6. The system of claim 4 wherein said second transmitting channel further includes a first modulo-2 adder for adding the output of said first delay means and pulse signals of said first transmitting channel, whereby the output of said first adder comprises the output of said second transmitting channel, and said second receiving channel comprises a second modulo-2 adder for adding the inputs of said first and second receiving channels, whereby the output of said second receiving channel corresponds to the input of said first adder.

7. The system of claim 6 wherein one of said first and second transmitting channels further includes pulse coding means, and wherein the corresponding receiving channel further includes pulse decoding means whereby the output of said decoding means corresponds to the input of said coding means.

References Cited

UNITED STATES PATENTS

| | | | |
|---|---|---|---|
| 3,069,657 | 12/1962 | Green et al. | 340—146.1 X |
| 3,195,048 | 7/1965 | Adams et al. | 340—146.1 X |
| 3,195,107 | 7/1965 | Rudolph | 340—146.1 |

MALCOLM A. MORRISON, *Primary Examiner.*

C. E. ATKINSON, *Assistant Examiner.*